R. MEYER.

BUCKLE-FASTENING.

No. 7,129. Reissued May 23, 1876.

Witnesses:

A. Moraga

O. A. Weidner

Inventor

Robert Meyer by his attorney

A. v. Briesen

THE NORRIS PETERS CO., PHOTO-LITHO., WASHINGTON, D. C.

UNITED STATES PATENT OFFICE.

ROBERT MEYER, OF BUFFALO, N. Y., ASSIGNOR TO CHARLES SCHUESSLER.

IMPROVEMENT IN BUCKLE-FASTENINGS.

Specification forming part of Letters Patent No. 61,628, dated January 29, 1867; antedated January 19, 1867; reissue No. 7,129, dated May 23, 1876; application filed May 4, 1876.

*To all whom it may concern:*

Figure 1:
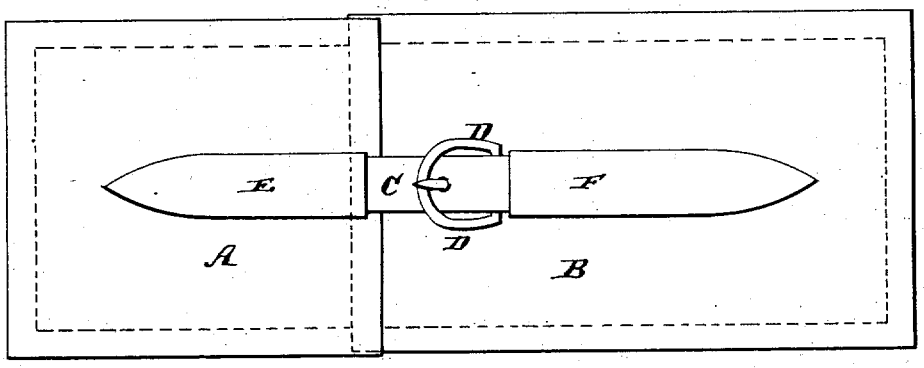
Figure 2:
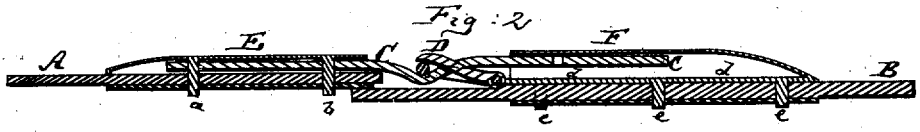
Figure 3:
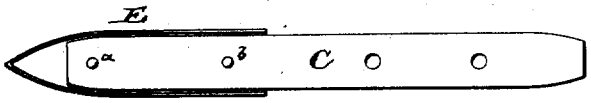
Figure 4:
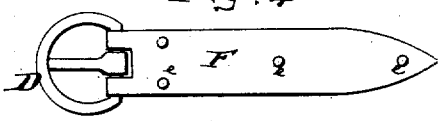

Be it known that I, ROBERT MEYER, of Buffalo, in the county of Erie and State of New York, have invented a new and Improved Buckle-Fastening, of which the following is a specification:

Figure 1 is a plan view of my improved fastening, showing it applied to the back curtain and back stay of a carriage. Fig. 2 is a longitudinal central section thereof. Fig. 3 is an inverted plan view of the shell or case to which the strap is secured; Fig. 4, an inverted plan view of the shell or case to which the buckle is secured.

Similar letters of reference indicate corresponding parts in all the figures.

This invention consists in the employment, in connection with a strap and buckle, of two hollow cases or shells, to which said strap and buckle are respectively secured. That one of the two cases to which the buckle is secured has a bottom plate, to which the buckle is attached by a joint.

In the drawing, the letters A and B represent two pieces of fabric, or pieces of the back stay and back curtain of a carriage to which my invention is applied. C is the strap, and D the buckle, by which strap and buckle the pieces A and B are to be held together. E is a case or shell, made of sheet metal or other suitable material, in form of an elongated inverted cup, open at one end and at the bottom. This case or shell is provided with downwardly-projecting pins *a b*, which, when they are passed through the fabric or piece A, serve to fasten the case or shell in place on said fabric. One end of the strap C is inserted in the shell E, and secured thereto by means of the pins *a b*, in manner clearly shown in the drawing. F is another case or shell, also made of sheet metal or other suitable material, but provided at the bottom with a plate, *d*, which forms part of said case or shell F. At the open end of the case or shell F the buckle D is attached by a joint to the plate *d*, as shown. By means of downwardly-projecting pins *e e*, with which the case or shell F is provided, the same is fastened to the fabric or piece B, in line with the case or shell E, as shown, so that the strap C can be readily buckled, and its loose end then confined in the case F, as clearly shown in Fig. 2

If desired, the outer end of the case F may also be left open, so that the strap may be passed through when buckled.

The cases or shells E and F may be made of suitable sizes, and stamped in dies of any ornamental shape or form desired, and can be used on all kinds of straps and buckles.

In place of the pins hereinabove specified, equivalent fastening means may be provided.

I claim as my invention—

1. The case or shell E, made with an open bottom, and provided with the pins *a b*, adapted to pass through the strap and firmly hold it in place, substantially as and for the purpose herein shown and described.

2. The case or shell F, made with the bottom plate *d*, and combined with the buckle D, which is attached to said plate, substantially as specified.

3. The case or shell F, made with the bottom plate *d*, and with the projecting pins *e e*, substantially as herein shown and described.

4. The combination of the case E and strap C with the case F and buckle D, substantially as herein shown and described.

ROBERT MEYER.

Witnesses:
J. SANGSTER,
S. M. SANGSTER.